United States Patent
Jablonka et al.

(10) Patent No.: US 6,345,686 B1
(45) Date of Patent: Feb. 12, 2002

(54) DRIVE ASSEMBLY

(75) Inventors: Helmut Jablonka, Muehlacker; Rolf Von Sivers, Weissach-Flacht; Hans-Martin Gerhard, Freiberg, all of (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/544,501

(22) Filed: Apr. 7, 2000

(30) Foreign Application Priority Data

Apr. 7, 1999 (DE) .......................... 199 15 591

(51) Int. Cl.[7] ................................ F16F 7/00
(52) U.S. Cl. ........................ 181/207; 181/209
(58) Field of Search ................. 181/207, 208, 181/209, 284, 286, 288, 290, 292, 293, 294, 295

(56) References Cited

U.S. PATENT DOCUMENTS 5,483,028 A * 1/1996 Holwerda .................. 181/207
6,069,840 A * 5/2000 Griffin et al. ............. 181/207
6,082,489 A * 7/2000 Iwao et al. ................ 181/286

FOREIGN PATENT DOCUMENTS

| DE | 39 03 530 | 8/1989 |
| DE | 41 21 813 | 1/1992 |
| DE | 41 42 885 | 7/1992 |
| DE | 197 04 376 | 8/1998 |
| EP | 0 297 226 | 1/1989 |

* cited by examiner

*Primary Examiner*—Khanh Dang
(74) *Attorney, Agent, or Firm*—Crowell & Moring LLP

(57) ABSTRACT

The drive assembly is formed by an internal-combustion engine which is installed in a passenger car. By means of bearings, supports or the like, the internal-combustion engine is held in position in an assembly space. By means of a wall of a vehicle body, the assembly space is separated from a vehicle occupant compartment. For achieving favorable psycho-acoustic effects, a sound support is provided between the internal-combustion engine and the wall of the vehicle body, by which sound support the engine-mechanical structure-borne sound is transmitted into the vehicle body, specifically for a targeted perception by occupants in the vehicle occupant compartment.

18 Claims, 2 Drawing Sheets

DRIVE ASSEMBLY

BACKGROUND AND SUMMARY OF THE INVENTION

This application claims the priority of German Application No. 199 15 591.7, filed Apr. 7, 1999, the disclosure of which is expressly incorporated by reference herein.

The invention relates to a drive assembly, particularly an internal-combustion engine which is fixed via bearings, supports or the like, in a motor vehicle, preferably a passenger car.

Products with an acoustically perceivable sound radiation are judged favorably if their sound effect is pleasant to the human ear. This applies mainly to passenger cars, which are driven by means of internal-combustion engines, and whose occupants, specifically the driver, consider important the sound make-up induced by the internal-combustion engine. The quality of the sound make-up of an internal-combustion engine is relevant and can be optimized by utilizing the knowledge acquired from the technical field of noise, vibration and harshness (NVH).

From European Patent Document EP 0 297 226 describing a known internal-combustion engine installed in a passenger car, a torque support is provided between the internal-combustion engine and a front wall of the vehicle body. Although this embodiment achieves very good damping of the excitation of the internal-combustion engine during the driving operation, no targeted acoustic effects are generated for the occupants of the passenger car.

It is therefore an object of the present invention to take such measures on a passenger car, particularly between the internal-combustion engine and the vehicle body, so that mainly the sound make-up, which is perceivable by the occupants in the passenger compartment, is pleasant, and the occupants receive defined sound information.

According to the present invention, this object is achieved by a drive assembly, particularly an internal-combustion engine fixed by means of bearings, supports and the like in a motor vehicle, preferably a passenger car, which is disposed in an assembly space. The assembly space is separated from an occupant compartment by a wall of a vehicle body. A sound support is provided between the internal-combustion engine and the wall. By way of the sound support, the engine-mechanical structureborne sound is transmitted into the vehicle body for the targeted perception by occupants in the occupant compartment. Additional characteristics which further develop the invention are described herein.

The principal advantages achieved by the invention are that, as a result of the sound support, engine-mechanical noises are tied to the occupant compartment, whereby the occupants, particularly the driver of the motor vehicle, receive positive psycho-acoustic feedback of the driving conditions. Furthermore, frequencies are transmitted that have sound-related relevance, in which case significant disturbing noises can be disconnected.

As the result of using an elastic element, spring and rod member, the sound support comprises components which are easily producible. The sound support can also be connected with the internal-combustion engine and the vehicle body at acceptable expenditures. In the case of one elastic element, elastic bodies are provided on both sides of a carrying device fixedly arranged on the internal-combustion engine. Supporting members of the rod member are mounded on the elastic bodies. In addition, the other elastic element is formed by a supporting member which is provided on both sides with a first elastic body and a second elastic body on which carrying devices rest. The carrying devices are fixedly connected with the internal-combustion engine. Finally, the first elastic body has a different characteristic than the second elastic body.

Other objects, advantages and novel features of the present invention will become apparent from the following detailed description of the invention when considered in conjunction with the accompanying drawings.

DETAILED DESCRIPTION OF THE DRAWINGS

Figure 1:
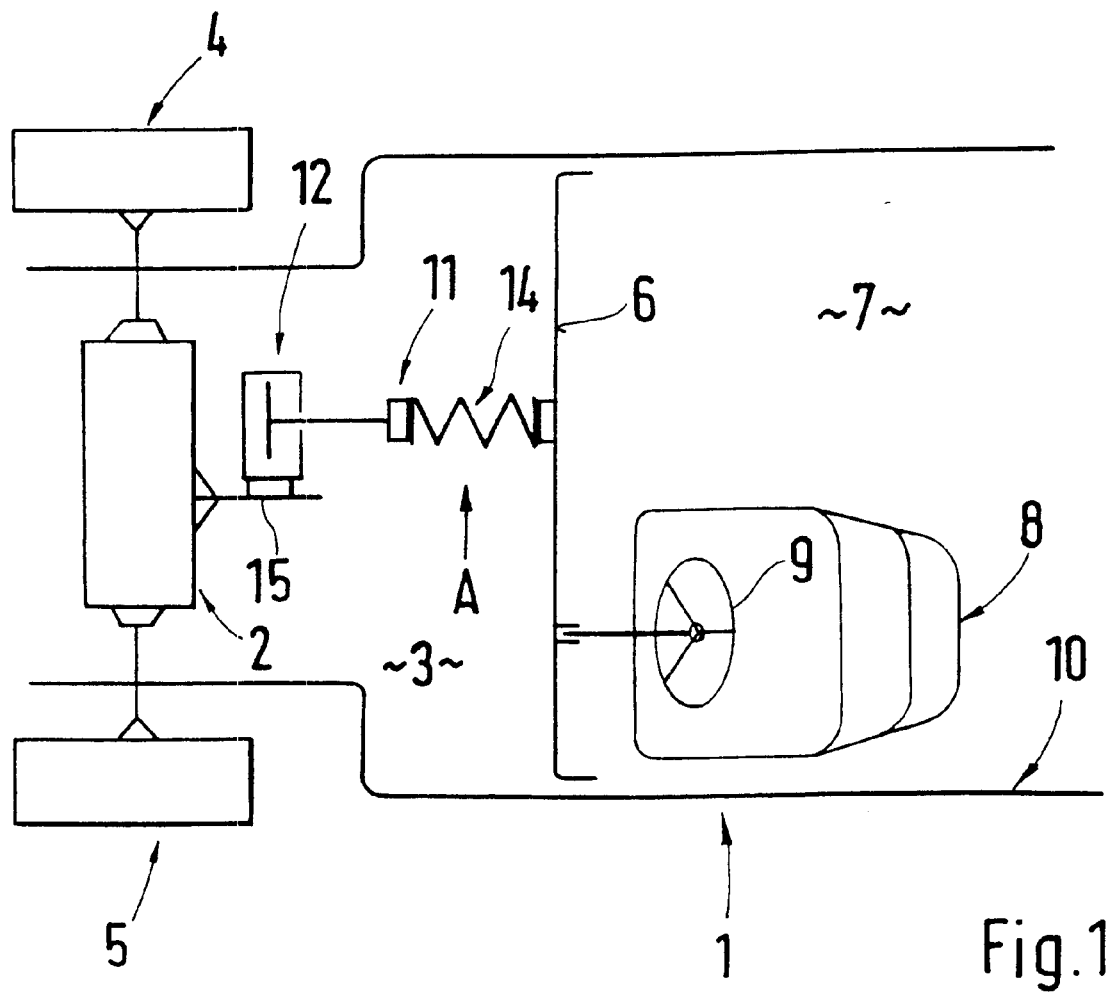
FIG. 1 is a schematic top view of a passenger car with the internal-combustion engine of the invention.

Referring to FIG. 1, a passenger car 1 comprises a transversely installed internal-combustion engine 2—in-line construction—which is arranged in an assembly space 3 and drives steerable wheels 4, 5 of the passenger car. The assembly space 3 is situated in the front of the passenger car 1 and is separated by a wall 6 from an occupant compartment 7 in which a seat 8 and a steering wheel 9 are outlined. The wall 6 is a component of a vehicle body 10 and can be provided with a radiator tank, a cross member or the like.

The internal-combustion engine 2 is held on the vehicle body 10 by means of bearings, torque supports (not shown), and a sound support 11 extending between the internal-combustion engine 2 and the wall 6 (optionally the radiator tank or the cross member). By means of the sound support 11, the engine-mechanical structure-borne noise is transmitted into the vehicle body 10; specifically, for the targeted perception by the vehicle occupants, particularly the driver in the vehicle occupant compartment 7.

Figure 2:
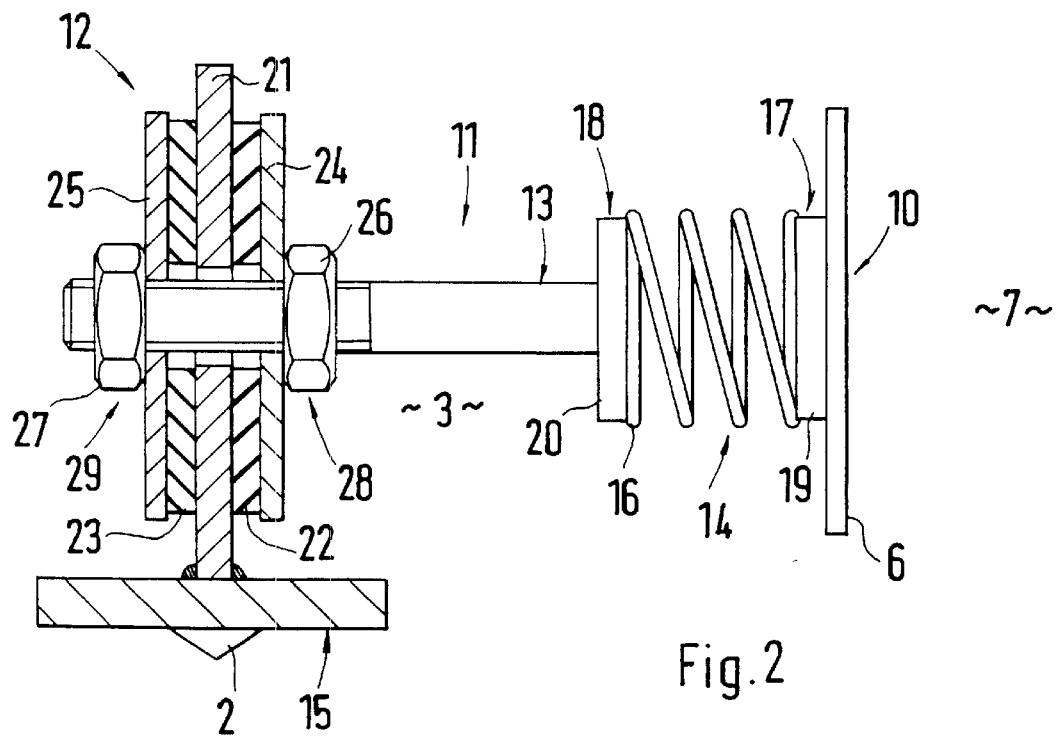
FIG. 2 is a view in the direction of the arrow A of FIG. 1.

According to FIG. 2, the sound support 11 comprises an elastic element 12, a rod member 13 and a spring 14. The elastic element 12 is held on the internal-combustion engine 2 by means of a console 15. The spring 14 is held on the wall 6 of the vehicle body 10. Between the spring 14 and the elastic element 12, a rod member 13 is operative which consists, for example, of metal and has a circular cross-section. The spring 14 is a coil spring 16, at whose ends 17, 18 a first receiving device 19 and a second receiving device 20 are mounted. Both receiving devices 19, 20 are flat circular parts, the first receiving device 19 being connected with the wall 6 and the second receiving device 20 being connected with the rod member 13.

The elastic element 12 comprises a plate-type carrying device 21—made of metal, plastic or the like—which is fixedly connected with the internal-combustion engine 2 and is provided with elastic bodies 22, 23 on both sides. The elastic bodies 22, 23 consist, for example, of rubber or a rubber-type elastomer, and are bounded directly by plate-type supporting members 24, 25. With respect to the material, the plate-type supporting members 24, 25 may be constructed like the carrying device 21. The elastic bodies 22, 23 are connected in a substance-locking manner, e.g., gluing, vulcanizing, etc., with the carrying device 21 and with the supporting members 24, 25. Stops 28, 29, which are constructed as adjusting screws 26, 27, rest against the supporting members 24, 25 and interact by way of threads with the rod member 13 penetrating the elastic element 12.

Figure 3:
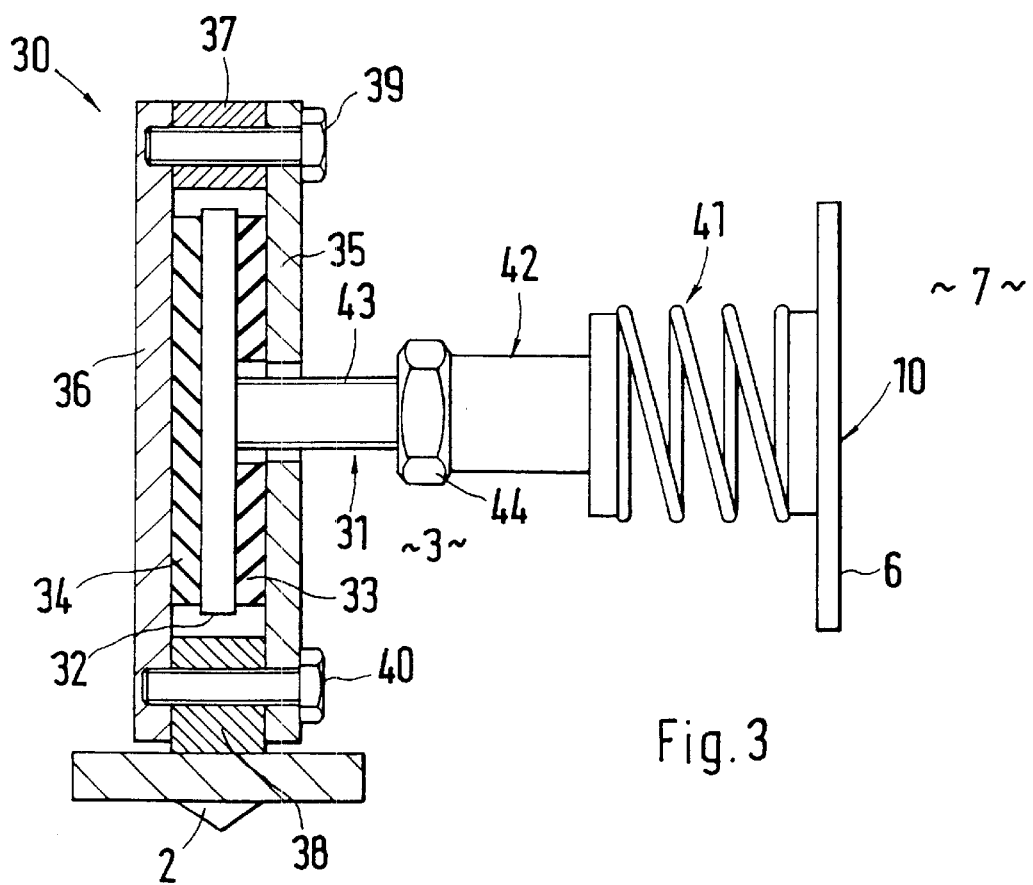
FIG. 3 is another embodiment corresponding to FIG. 2.

According to FIG. 3, another elastic element 30 is disclosed which acts approximately like the elastic element 12, although it has a different construction. Thus, a rod member 31 comprises a plate-type supporting member 32. The plate-type supporting member 32 is connected with the rod member 31 and is connected with a first elastic body 33 on one side and a second elastic body 34 on the other side. These elastic bodies 33, 34 may also be made of rubber or a rubber-type elastomer, plate-type carrying devices 35 36 being applied to their sides facing away from the supporting member 32. The carrying devices 35, 36 are fixedly connected with the internal-combustion engine 2. The elastic bodies 33, 34 are connected with the supporting member 32 and the carrying device 35, 36 in a substance-locking manner. In addition, the first elastic body 33 has a different characteristic than the second elastic body 34; in other words, the elastic body 33 is designed mainly for absorbing axial loads; the elastic body 34 is designed for absorbing tension loads.

The carrying devices 35, 36 are assembled by means of spacers 37, 38 and are connected with one another by means of screws 39, 40. Finally, the rod member 31 is connected with a coil spring and has two longitudinally displaceable rod elements 42, 43 which can be fixed with respect to their position by means of an adjusting screw 44.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive assembly in the form of an internal combustion engine fixedly arranged in an assembly space of a motor vehicle having an occupant compartment, comprising:
   a wall of a vehicle body separating the occupant compartment from the assembly space;
   a sound support connected with and between the internal-combustion engine and the wall, said sound support transmitting engine-mechanical structure borne sound into the vehicle body for targeted perception by occupants of the occupant compartment.

2. Drive assembly according to claim 1, wherein the sound support comprises at least one elastic element and a spring.

3. Drive assembly according to claim 2, wherein the elastic element cooperates with the internal-combustion engine, and the spring cooperates with the wall of the vehicle body.

4. Drive assembly according to claim 1, wherein an sound support comprises a rod member operative between the elastic element and a spring.

5. Drive assembly according to claim 2, wherein the sound support comprises a rod member operative between the elastic element and the spring.

6. Drive assembly according to claim 2, wherein the spring is a coil spring, whose ends are provided with a first receiving device and a second receiving device.

7. Drive assembly according to claim 3, wherein the spring is a coil spring, whose ends are provided with a first receiving device and a second receiving device.

8. Drive assembly according to claim 4, wherein the spring is a coil spring, whose ends are provided with a first receiving device and a second receiving device.

9. Drive assembly according to claim 8, wherein the first receiving device is connected with the wall of the vehicle body and the second receiving deice is connected with the rod member.

10. Drive assembly according to claim 2, wherein the elastic element comprises a carrying device provided on both sides with elastic bodies, against which elastic bodies supporting members rest, said supporting members interacting with stops of the rod member penetrating the elastic element.

11. Drive assembly according to claim 10, wherein the carrying device is fixedly connected with the internal-combustion engine.

12. Drive assembly according to claim 11, wherein the stops are constructed as adjusting screws of the rod member.

13. Drive assembly according to claim 5, wherein the rod member of the elastic element comprises a supporting member, which supporting member is provided with a first elastic body on one side and a second elastic body on the other side, wherein carrying devices rest on the first and second elastic bodies, respectively, said carrying devices being fixedly connected with the internal-combustion engine.

14. Drive assembly according to claim 13, wherein the first elastic body has a different elastic characteristic than the second elastic body.

15. Drive assembly according to claim 14, wherein the first elastic body is designed for axial loads and the second elastic body is designed for tension loads.

16. Drive assembly according to claim 13, wherein the carrying devices are assembled via spacers and are connected with one another via screws.

17. Drive assembly according to claim 13, wherein the rod member is formed by two longitudinally displaceable rod elements an d a first adjusting screw.

18. A method of achieving favorable psycho-acoustic effects in an occupant compartment of a motor vehicle during vehicle operation, the method comprising the acts of:
   connecting an adjustable sound support with and between an engine of the vehicle in an assembly space and a wall of the vehicle body separating the assembly space from the occupant compartment; and
   adjusting the sound support to transmit engine-mechanical structure borne sound via the sound support into the vehicle body for a targeted perception by an occupant of the vehicle.

* * * * *